(12) United States Patent
Yuque

(10) Patent No.: US 10,050,584 B2
(45) Date of Patent: Aug. 14, 2018

(54) COOLING APPARATUS FOR SOLAR PANELS

(71) Applicant: Hardware Labs Performance Systems, Inc., Quezon (PH)

(72) Inventor: Wilbert Yuque, Quezon (PH)

(73) Assignee: Hardware Labs Performance Systems, Inc. (PH)

( * ) Notice: Subject to any disclaimer, the term of this patent is extended or adjusted under 35 U.S.C. 154(b) by 103 days.

(21) Appl. No.: 15/071,557

(22) Filed: Mar. 16, 2016

(65) Prior Publication Data

US 2017/0272031 A1    Sep. 21, 2017

(51) Int. Cl.
   *H02S 40/42*     (2014.01)
   *H01L 31/052*    (2014.01)

(52) U.S. Cl.
   CPC .................. *H02S 40/425* (2014.12)

(58) Field of Classification Search
   CPC .............. H01L 31/052; H02S 40/42
   See application file for complete search history.

(56) References Cited

U.S. PATENT DOCUMENTS

| | | |
|---|---|---|
| 3,988,166 A | 10/1976 | Beam |
| 6,407,328 B2 | 6/2002 | Kleinwachter |
| 7,754,963 B2 | 7/2010 | Fujisaki et al. |
| 8,648,249 B1 | 2/2014 | West |
| 8,922,972 B2 | 12/2014 | Korman et al. |
| 9,016,292 B1 * | 4/2015 | Schneider .......... F24J 2/30 134/104.2 |
| 9,070,808 B2 | 6/2015 | Intrieri et al. |
| 9,157,657 B2 | 10/2015 | Guha et al. |
| 2002/0066473 A1 | 6/2002 | Levy et al. |
| 2008/0053513 A1 | 3/2008 | Palmer |
| 2011/0168233 A1 | 7/2011 | Lee et al. |
| 2011/0197943 A1 | 8/2011 | Pleva et al. |
| 2012/0152318 A1 | 6/2012 | Kee |

(Continued)

FOREIGN PATENT DOCUMENTS

| | | |
|---|---|---|
| CN | 101409310 | 4/2009 |
| DE | 202009009544 | 10/2009 |

(Continued)

OTHER PUBLICATIONS

K.A. Moharram, Enhancing the performance of photovoltaic panels by water cooling, Ain Shams Engineering Journal, Ain Shams University, May 6, 2013, pp. 869-877.

*Primary Examiner* — Susan Dang Leong
(74) *Attorney, Agent, or Firm* — Erickson Kernell IP, LLC

(57) ABSTRACT

A solar panel cooling system and apparatus. The cooling system includes a shroud that is coupleable to a back side of a solar panel. The shroud encloses a space on the back side of the solar panel and includes a nozzle for spraying cooling fluid onto the back side of the solar panel. The cooling fluid spray is contained within the space and is recirculated through a closed loop system to cool the cooling fluid before again being sprayed by the nozzle. Thermal energy absorbed by the solar panel is transferred to the cooling fluid to cool the solar panel. A backing element can be applied to the solar panel that aids transfer of thermal energy to the cooling fluid, directs the drainage flow of the cooling fluid, or comprises a thermo-electric generator to generate additional electrical energy from the system.

18 Claims, 12 Drawing Sheets

(56) References Cited

U.S. PATENT DOCUMENTS

| | | |
|---|---|---|
| 2013/0036752 A1 | 2/2013 | Cochran et al. |
| 2013/0118551 A1 | 5/2013 | Sako |
| 2013/0192660 A1 | 8/2013 | Siskavich |
| 2013/0240017 A1 | 9/2013 | Lasich |
| 2013/0291923 A1 | 11/2013 | Kim |
| 2013/0306136 A1 | 11/2013 | Hendrickson, Jr. |
| 2014/0060620 A1 | 3/2014 | Placer |
| 2014/0150848 A1 | 6/2014 | Nicaise |
| 2014/0166075 A1 | 6/2014 | Koppikar et al. |
| 2014/0182658 A1 | 7/2014 | Soon |
| 2014/0299174 A1 | 10/2014 | Yu et al. |
| 2014/0318599 A1 | 10/2014 | Kim |
| 2014/0332052 A1 | 11/2014 | Yacoubian et al. |
| 2014/0332055 A1 | 11/2014 | Lin et al. |
| 2015/0000723 A1 | 1/2015 | Cheng et al. |
| 2015/0020866 A1 | 1/2015 | Kuster |
| 2015/0027509 A1 | 1/2015 | Levin |
| 2015/0027511 A1 | 1/2015 | Jang |
| 2015/0040964 A1 | 2/2015 | Matalon |
| 2015/0162473 A1 | 6/2015 | Chen et al. |
| 2015/0207458 A1 | 7/2015 | Hui et al. |
| 2015/0280040 A1 | 10/2015 | Siddiqui et al. |
| 2015/0325734 A1 | 11/2015 | Pisharodi |
| 2015/0349178 A1 | 12/2015 | Rubio et al. |
| 2015/0357969 A1 | 12/2015 | Fernandez de Cordoba Sanz |

FOREIGN PATENT DOCUMENTS

| | | |
|---|---|---|
| ES | 2347116 | 10/2010 |
| FR | 2961024 | 12/2011 |
| GB | 2504802 | 2/2014 |
| JP | 6213084 | 1/1987 |
| JP | 2005039025 | 2/2005 |
| WO | 2009139586 | 11/2009 |
| WO | 2010005402 | 1/2010 |
| WO | 2012011634 | 1/2012 |

\* cited by examiner

COOLING APPARATUS FOR SOLAR PANELS

BACKGROUND

The search for greener energy sources has grown the interest and use of solar panels worldwide. Solar panels include a plurality of photovoltaic cells that convert energy received from the sun into electric energy. It has been found that the efficiency of the photovoltaic cells in converting solar energy to electricity is related to the temperature of the photovoltaic cell; the warmer the cells the lower the efficiency and/or production of electricity therefrom.

There have thus been many attempts to provide apparatus and systems for cooling solar panels in order to increase the efficiency and/or electrical output of the photovoltaic cells therein. For example, U.S. Pat. No. 3,988,166 to Beam describes a fluid filled chamber in contact with a plurality of solar cells to enable the fluid to absorb heat energy from the solar cells. The chamber may be coupled to a heat exchanger to dissipate the heat energy absorbed by the liquid therein.

U.S. Pat. No. 7,754,963 to Fujisaki et al. and U.S. Pat. No. 9,070,808: Intrieri et al. describe cooling systems for solar cells that provide fluid passageways, e.g. pipes, tubes, or channels that are in contact with the solar cells and through which a cooling fluid is flowed to absorb heat from the solar cells.

British Patent Application Publication No. 2,504,802 to Mitev describes a cooling system for solar panels that employs capillary fibers that are placed in contact with a rear side of the solar panel. Cooling fluid is passed over the fibers to provide evaporative cooling of the panels.

The known systems can be bulky, difficult to adapt to existing solar panel arrays, and are often overly complex. Available evaporative-cooling systems are typically open systems that require a cooling fluid to be replenished due to loss thereof through evaporation or drainage from the solar panel.

SUMMARY

A high-level overview of various aspects of the invention is provided here to introduce a selection of concepts that are further described in the Detailed-Description section below. This summary is not intended to identify key features or essential features of embodiments of the invention, nor is it intended to be used in isolation to determine the scope of the described subject matter. In brief, this disclosure describes, among other things, solar panel cooling systems, apparatus, and methods therefor.

The cooling system comprises a closed-loop system configured to couple to a back side of existing solar panels as a retrofit assembly or can be incorporated into solar panel assemblies during manufacture thereof. The cooling system includes a shroud, one or more spray nozzles, and a fluid circuit.

The shroud encloses the back side of the solar panel and provides a drain port along a bottom portion thereof. The spray nozzles are disposed in a back wall of the shroud that is spaced apart from the back side of the solar panel. The nozzles are directed to spray a cooling fluid onto the back side of the solar panel. The cooling fluid may drain, flow, or drip from the backside of the solar panel toward the drain port in the shroud where the fluid is collected and returned to the circuit. Contact of the fluid with the backside of the solar panel enables transfer of thermal energy from the solar panel to the fluid, thereby cooling the solar panel.

The fluid circuit includes one or more pumps for circulating the fluid and sufficiently pressurizing the circuit to spray the fluid from the nozzles at a desired rate. The fluid circuit also includes a heat exchanger configured to cool the fluid to remove the thermal energy transferred to the fluid from the solar panel, and a reservoir for storing a quantity of the cooling fluid.

In one embodiment, one or more thermally conductive elements may be coupled to the back side of the solar panel and enclosed by the housing to aid thermal energy transfer from the solar panel to the cooling fluid. The elements may include thermally conductive coatings, fins, ribs, pins, or other features. The elements may also aid to seal or liquid-proof the back side of the solar panel. One or more diversion elements may also be provided on the back side of the solar panel to divert the flow of warmed cooling fluid away from the back side of the solar panel to reduce thermal contamination between portions of the solar panel.

In another embodiment, the thermally conductive elements may comprise a thermo-electric generator (TEG) or a thermo-electric couple (TEC) applied to the back side of the solar panel. The TEC may be employed to provide an additional source of electrical energy generation through thermoelectric effects known as the Seebeck effect and/or the reverse Peltier effect, among others. Heating of one surface of the TEC by the solar panel and cooling of an opposite surface of the TEC by the cooling fluid forms a temperature gradient across the TEC by which electrical energy can be generated while also cooling the solar panel.

DESCRIPTION OF THE DRAWINGS

Illustrative embodiments of the invention are described in detail below with reference to the attached drawing figures, and wherein.

DETAILED DESCRIPTION

Figure 1:
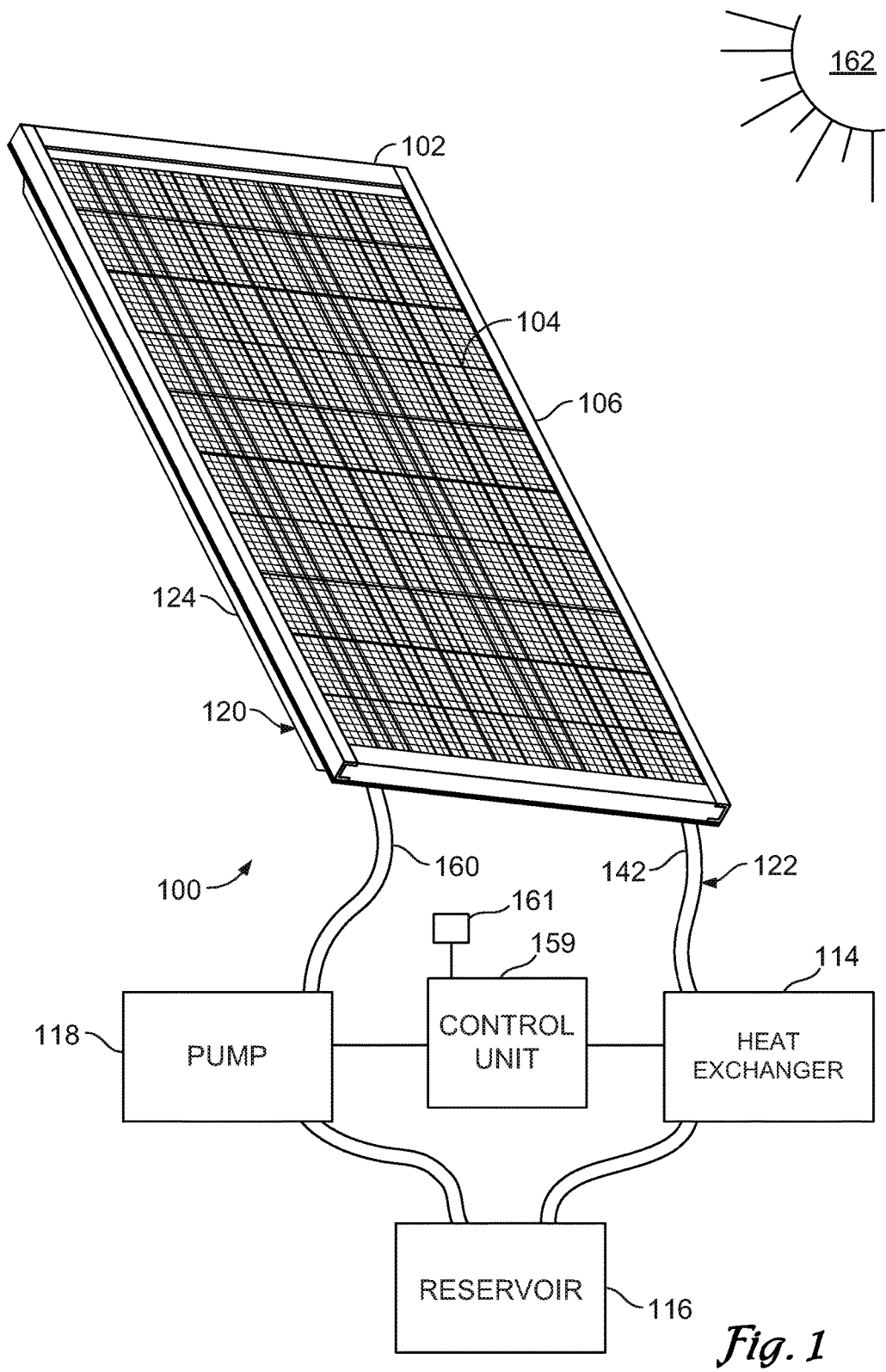
FIG. 1 is a schematic view of a solar panel cooling system depicted in accordance with an embodiment of the invention.

The subject matter of select embodiments of the invention is described with specificity herein to meet statutory requirements. But the description itself is not intended to necessarily limit the scope of embodiments thereof. Rather, the subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" as used herein denote deviations from the exact value by +/−10%, preferably by +/−5% and/or deviations in the form of changes that are insignificant to the function.

Embodiments of the invention are described herein with respect to the drawings in which reference numerals are employed to identify particular components or features. Similar elements in the various embodiments depicted are provided with reference numerals having matching second and third digits but with differing first digits, e.g. element 10 is similar to elements 110, 210, etc. Such is provided to avoid redundant description of similar features of the elements but is not intended to indicate the features or elements are necessarily the same.

With reference now to FIG. 1, a cooling system 100 for a solar panel 102 is described in accordance with an embodiment of the invention. The solar panel 102 can comprise an available off-the-shelf solar panel. The term solar panel, as used herein, refers to a module or array of photovoltaic solar cells which can be arranged in a generally planar or non-planar configuration. One exemplary solar panel includes a planar arrangement of solar cells in a six-by-ten cell grid. The solar panel 102 may employ any photovoltaic or other solar cell technology or configuration including wafer-based or thin-film-based solar cells which can be arranged in a series or parallel circuit configuration to produce a desired output voltage and current among other output characteristics.

A variety of additional components may be included in the solar panel 102 or provided in association with the solar panel 102 to control operation thereof including, for example, a module 108. The module 108 may be provided on the back side of the panel 102 and in electrical communication with each of the solar cells and provides the electrical output of the solar cells to a power grid or device via one or more output connections (not shown). The module 108 may control operation of each of the solar cells individually or in groups to maximize output from the solar panel 102.

A variety of other components may be provided on or in the solar panel 102 or in association with the solar panel 102 and/or an associated control unit 159 as described more fully below. For example, the solar panel 102 may be provided with an inverter for converting the electrical output from the solar panel 102 from direct current (DC) to alternating current (AC), sun tracking equipment that moves the solar panel 102 to follow the path of the sun to maintain optimum incidence of sunlight on the solar cells, and cell optimization controllers that optimize the operation of each of the individual solar cells when shadows or other factors affect the performance thereof, among other components may also be provided. Such components are known in the art and are not further shown or described in detail herein.

The solar panel 102 includes a planar array 104 of solar cells disposed within a substantially rigid frame 106. The frame 106 comprises a plurality of elongate members formed from, for example, aluminum channel members or the like that are coupled together at ends thereof. The frame 106 supports the array 104 for mounting and/or handling thereof.

Figures 4, 5:
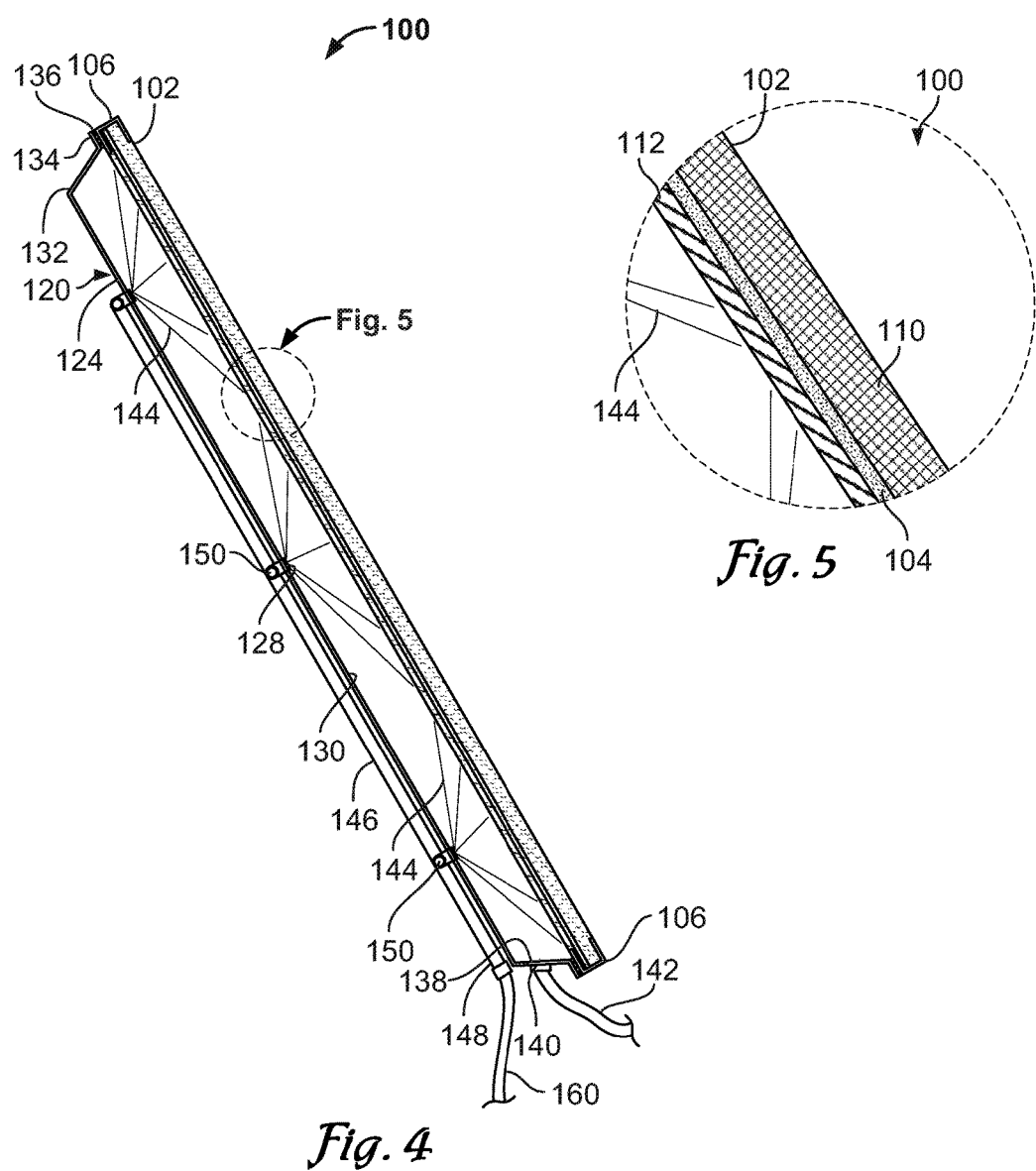
FIG. 4 is a cross-sectional side view of a solar panel with a cooling apparatus depicted in accordance with an embodiment of the invention.
FIG. 5 is an enlarged partial view of the solar panel and cooling apparatus of FIG. 4.

As depicted in FIGS. 4 and 5, the array 104 may include one or more elements layered on surfaces of the planar array 104, such as a top element 110 and a backing element 112. Although only a single top element 110 and a single backing element 112 are shown, it is understood that a plurality of top and or backing elements 110, 112 may be employed and that the top and backing elements 110, 112 may comprise a plurality of elements layered on one another or disposed side-by-side.

The top element 110 can comprise a variety of components such as a glass, plastic, or similar substantially transparent layer that protects the solar cells from environmental elements. The top element 110 might also function as or provide one or more lenses that focus incident light onto one or more of the solar cells or that filter one or more wavelengths of light from the incident light. A variety of other components are known in the art and may be included in the top element 110 without departing from the scope described herein.

The backing element 112 may provide rigidity and/or weatherproofing to the back side of the array 104. For example, the backing element 112 may comprise a liquid-proof coating applied to the back side of the array 104 to prevent liquids from interfering with operation of the solar cells. The backing element 112 may also include a layer or coating with a high thermal conductivity, such as a film, coating, laminate, plating, panel, or the like comprised of a metallic material like a copper or aluminum alloy, or a composite material such as graphene, or similar materials and combinations thereof.

Figure 6:
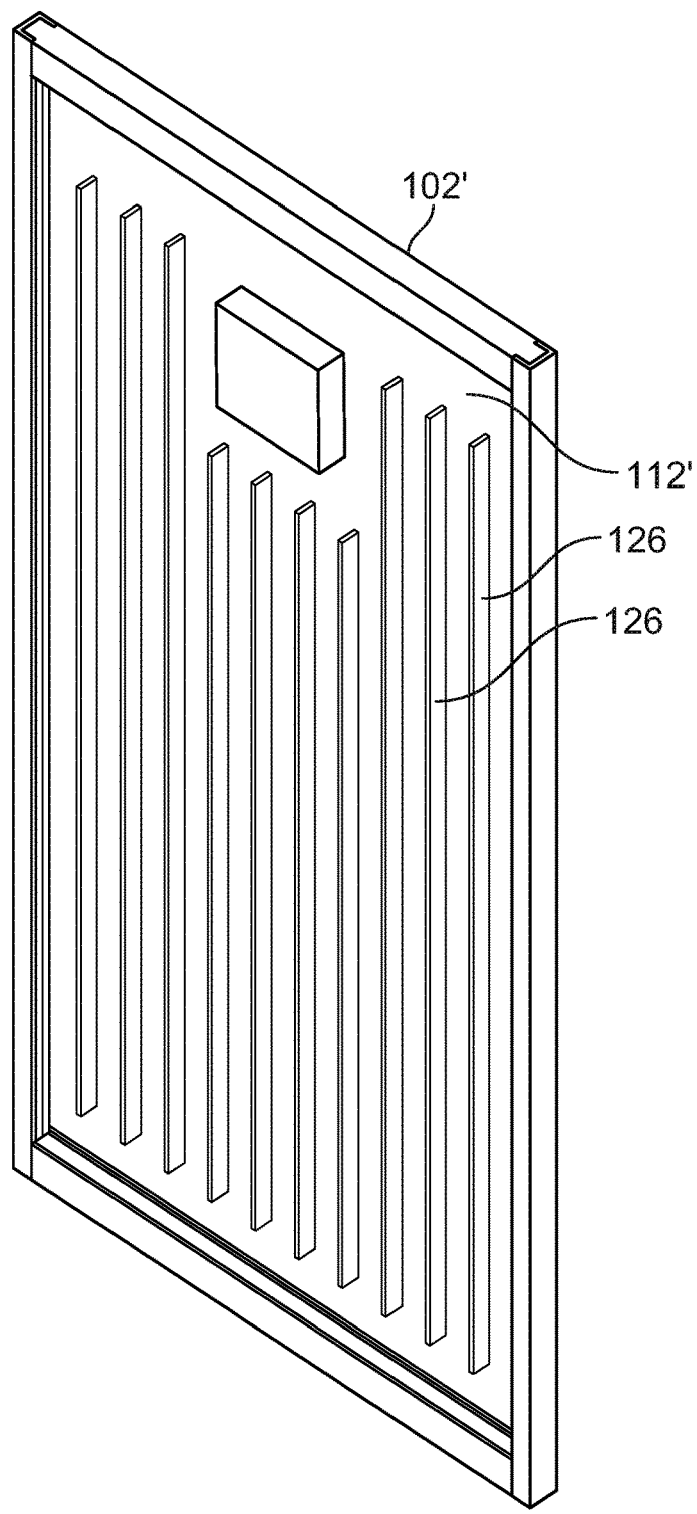
FIG. 6 is a back side perspective view of a solar panel depicting thermal transfer features applied to the backside of the solar panel in accordance with an embodiment of the invention.

As depicted in FIG. 6, in one embodiment a backing element 112' on a solar panel 102' includes surface features 126 to aid in removal of thermal energy from the backing element 112' and thus the underlying array 104. The surface features 126 are preferably formed from one or more materials having a high thermal conductivity. The surface features 126 shown in FIG. 6 comprise a plurality of linear ribs or flanges extending away from the array 104. But the surface features 126 can comprise rods, ridges, channels, bumps, or other protuberances, surface textures, or the like arranged in a desired configuration.

Figure 12:
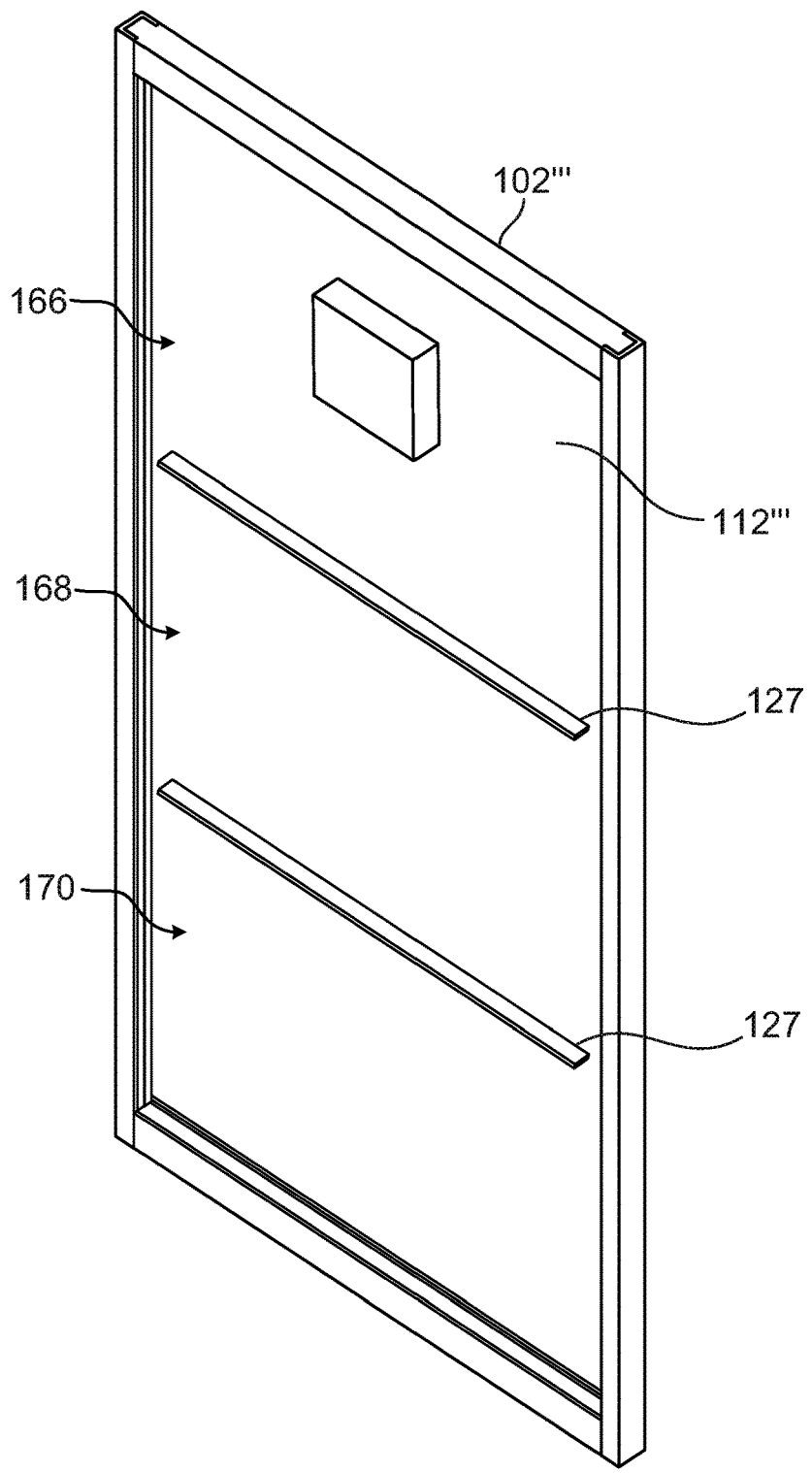
FIG. 12 is a back side perspective view of a solar panel with diversion flanges disposed thereon depicted in accordance with an embodiment of the invention.
Figure 13:
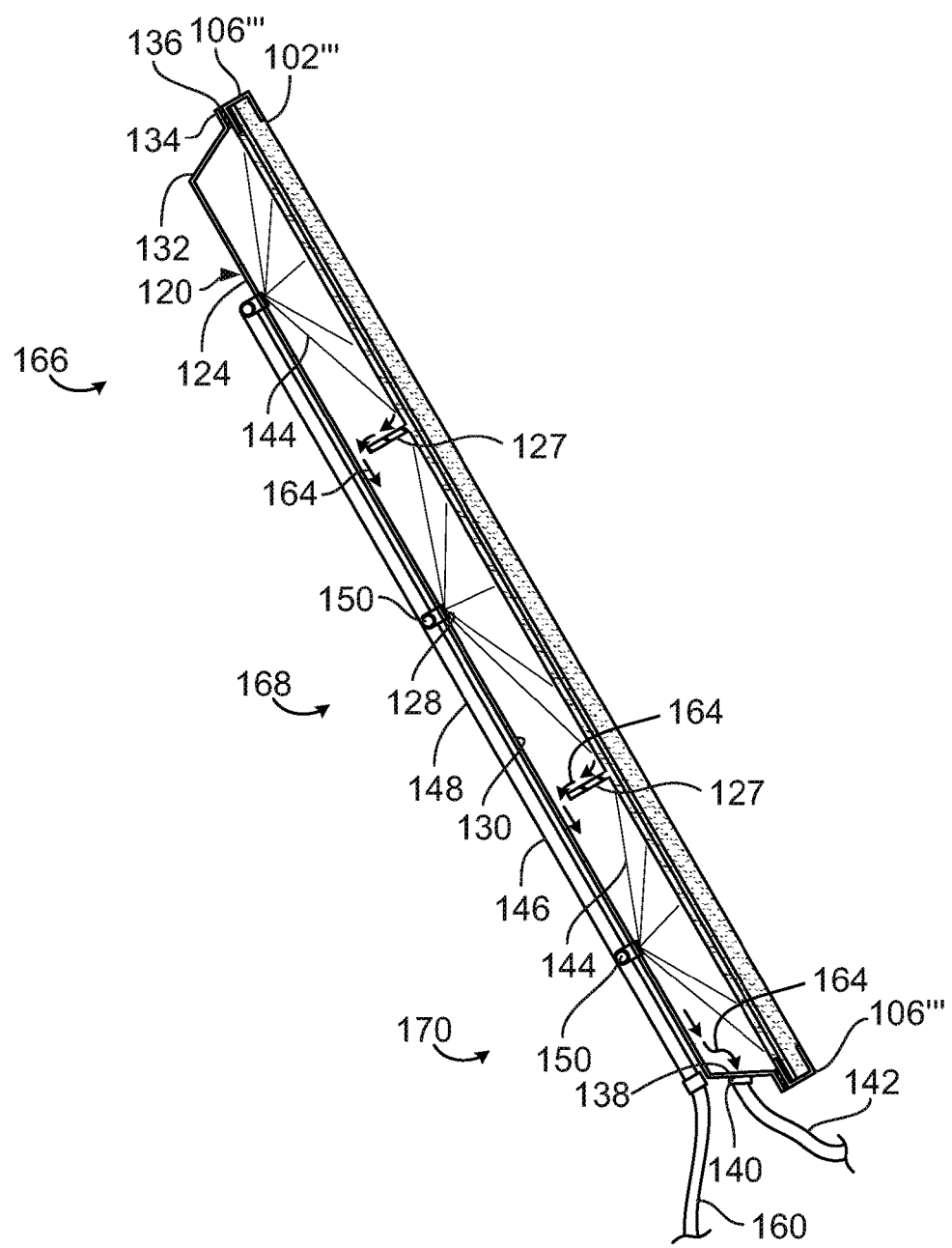
FIG. 13 is cross-sectional view of the solar panel of FIG. 12 with a cooling apparatus depicted in accordance with an embodiment of the invention.

The surface features 126 can be configured to increase the surface area for contact with the cooling fluid, to aid or inhibit the flow of the cooling fluid along the back side of the array 104, to direct a flow of the cooling fluid along desired areas of the array 104 or in a desired direction, among other design considerations. For example, as depicted in FIGS. 12 and 13, a backing element 112''' includes surface features comprising a pair of diversion flanges 127 that extend horizontally across at least a portion of the backing element 112''' and divert warmed cooling fluid away from the backing element 112''', as described more fully below.

Figure 7:
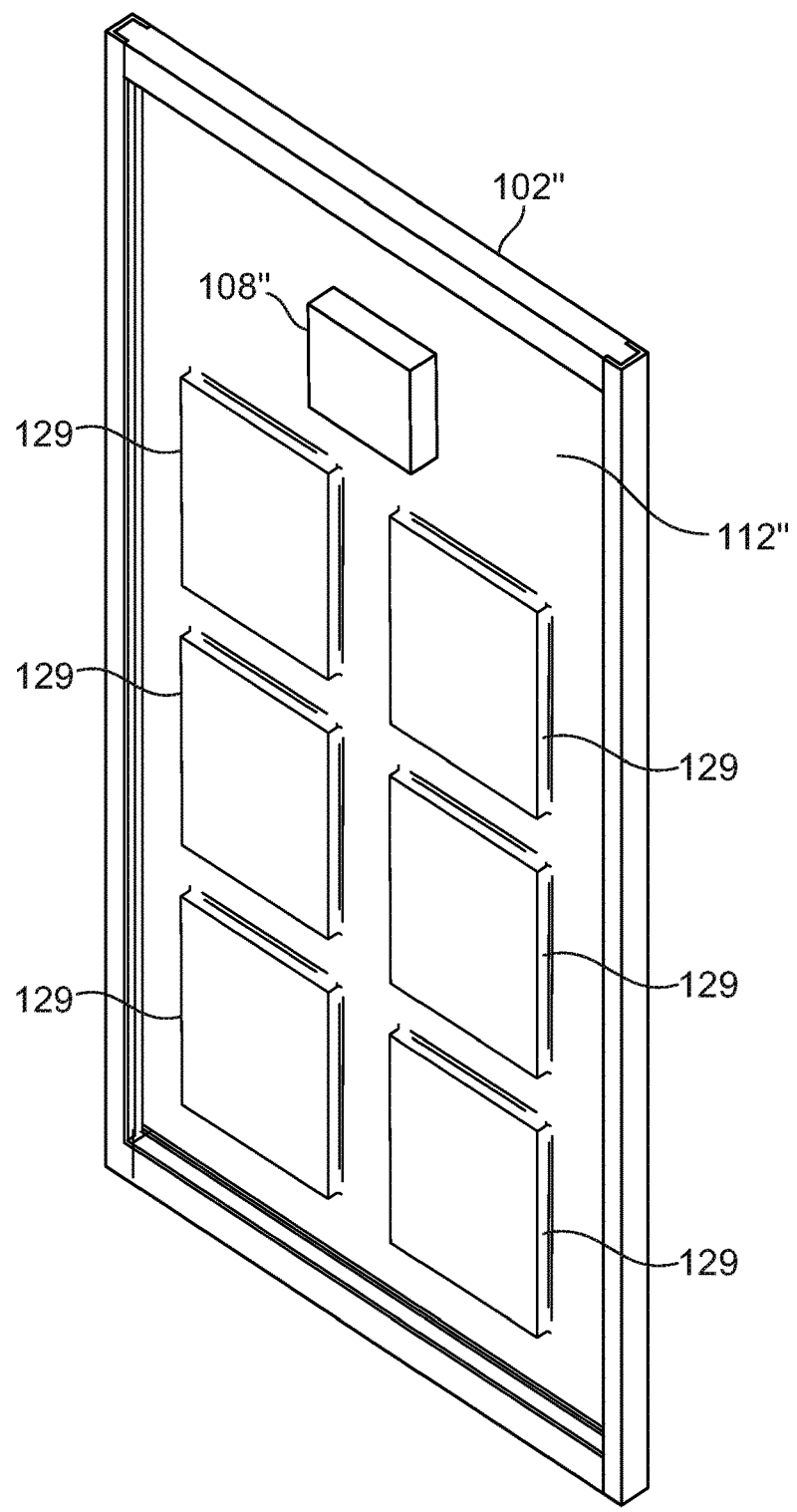
FIG. 7 is a back side perspective view of a solar panel with a backing element that includes a plurality of thermo-electric generator units depicted in accordance with an embodiment of the invention.

In another embodiment depicted in FIG. 7, the backing element 112" includes a thermo-electric generator (TEG)

129 or a Seebeck generator which may also be termed a thermo-electric couple (TEC). TEGs are known in the art for generation of electrical energy through a thermoelectric effect known as the Seebeck effect and/or the reverse Peltier effect, among other modes of operation. Generally, the Seebeck effect describes the generation of electrical energy from a voltage difference produced by applying a thermal gradient between two dissimilar conductors.

The backing element 112' can be configured to include or comprise a single TEG 129, a plurality of TEGs 129, or to include one or more TEGs 129 integrated therewith. FIG. 7 depicts a backing element 112" that includes a plurality of TEGs 129, the TEGs 129 can be positioned on the back side of the array 104" to correspond with regions or elements having the greatest concentrations of thermal energy or that require the greatest amount of cooling. The TEGs 129 may also be arranged to correspond with areas in which the TEGs 129 can receive the greatest level of cooling. As such, the TEGs 129 can be arranged to provide the greatest thermal gradient between opposing surfaces thereof. In one embodiment, the backing element 112" comprises a single TEG 129 that is rigid, flexible, or semi-flexible that is laminated onto the back side of the solar panel 102" and that covers all or only a portion of the back side of the solar panel 102".

With reference again to FIG. 1, the cooling system 100 includes a heat exchanger 114, a reservoir 116, a pump 118, and a shroud assembly 120. The heat exchanger 114, the reservoir 116, the pump 118, and the shroud assembly 120 are in fluid communication with one another and form a closed system or closed loop 122 through which a cooling fluid is circulated. The closed loop 122 contains the cooling fluid therein and resists loss of the cooling fluid to the environment during operation of the cooling system 100. The cooling fluid may comprise any desired fluid including, for example, water, deionized water, glycol solutions, dielectric solutions, oils, and alcohols, among others and/or combinations thereof.

The heat exchanger 114, the reservoir 116, and the pump 118 comprise available technologies suitable to receive the cooling fluid from the shroud assembly 120 in an elevated temperature state, cool the heated cooling fluid to a desired operating temperature, store a supply of the cooling fluid, and supply the cooling fluid to the shroud assembly 120 at a desired operational temperature and pressure or flow rate. For example, the heat exchanger 114 can comprise a radiator unit, a refrigeration unit, a liquid-to-liquid heat exchanger, or a geothermal cooling unit, among a variety of other systems.

The reservoir 116 may be sized to accommodate sufficient cooling fluid for a single or a plurality of solar panels 102 and may be cooled or disposed underground to maintain the cooling fluid at a constant operating temperature. Similarly, the pump 118 can be configured to provide cooling fluid to a single or a plurality of solar panels 102. The pump 118 can utilize available pump configurations including radial flow, peristaltic, eductor-jet, and centrifugal type pumps, among others. Although a particular arrangement of the heat exchanger 114, the reservoir 116, and the pump 118 are shown in FIG. 1, it is understood that the components can be rearranged, additional components added, or one or more of the components combined without departing from the scope of embodiments of the invention described herein.

Figure 2:
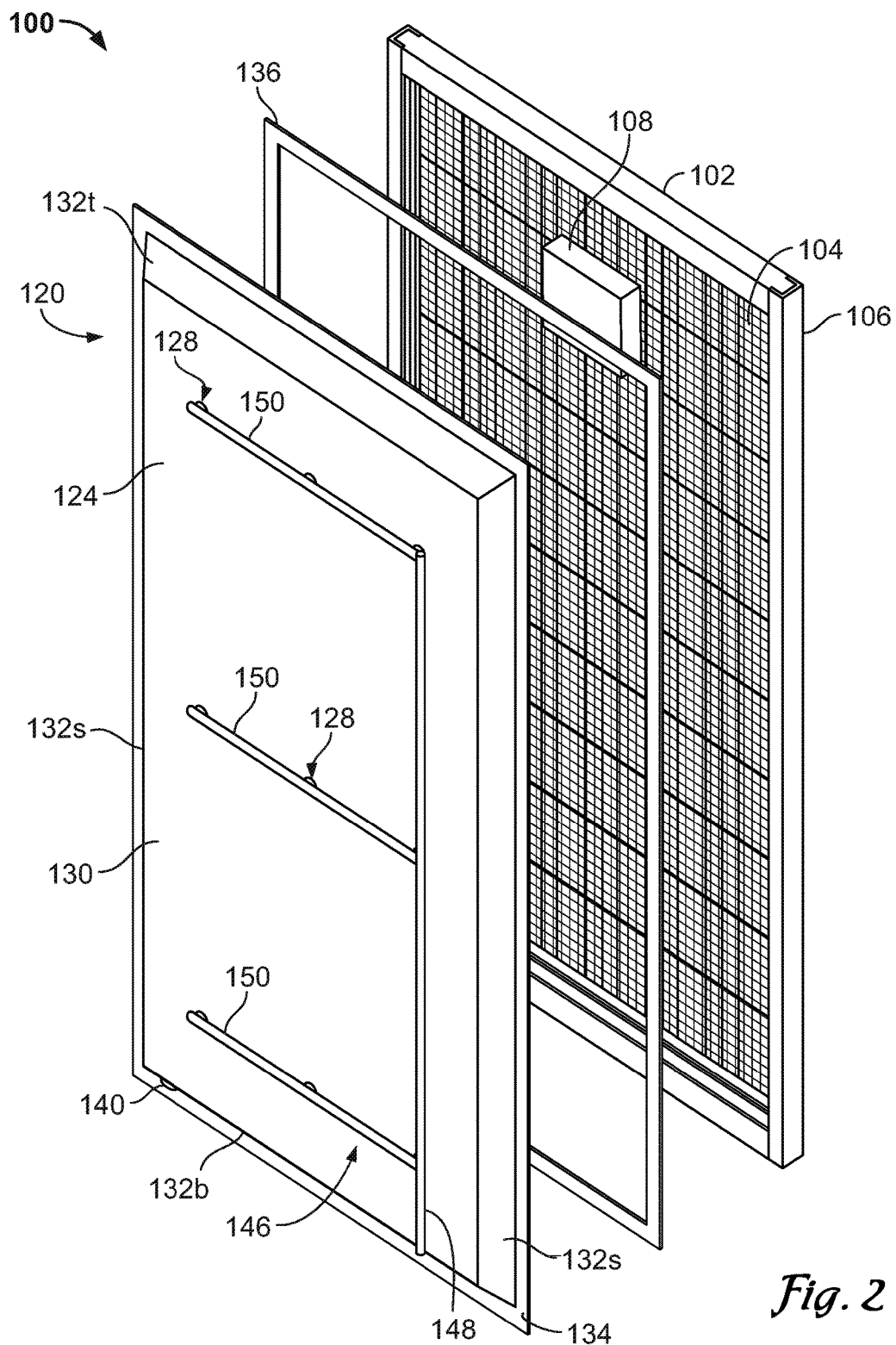
FIG. 2 is a back side exploded perspective view of the solar panel with a cooling apparatus of FIG. 1 depicted in accordance with an embodiment of the invention.
Figure 3:
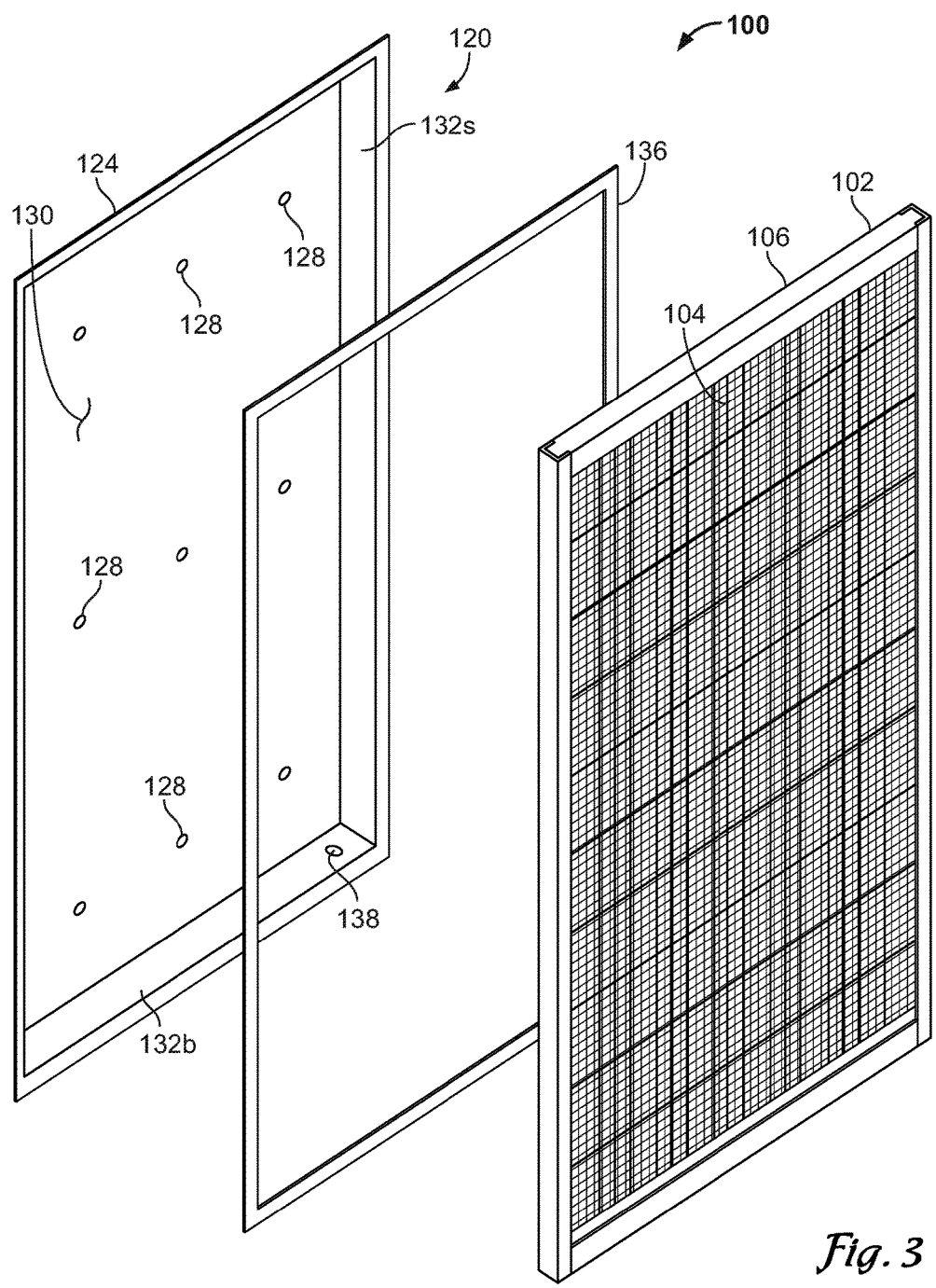
FIG. 3 is a front side exploded perspective view of the solar panel and cooling apparatus of FIG. 2.

The shroud assembly 120 comprises a shroud 124 with one or more nozzles 128 disposed therein. As depicted in FIGS. 2 and 3, the shroud 124 includes a generally planar rear wall 130 with a forwardly depending outer wall 132 extending from the perimeter of the rear wall 130. A flange 134 extends outwardly from a terminal edge of the outer wall 132. The flange 134 is configured to couple with the frame 106 of the solar panel 102. The flange 134 can be configured to abut a back side of the frame 106 and/or may wrap at least partially around an outer perimeter of the frame 106 to receive and cradle the frame 106.

A gasket 136 is provided between the flange 134 and the frame 106 of the solar panel 102 to aid formation of a liquid-tight and/or air-tight seal therebetween. The gasket 136 can comprise an available gasket material, such as a rubber, silicon, or similar material. The gasket 136 can be a pre-formed component or can comprise a gel, liquid, paste, or similar compound that is applied to the surface of the flange 134 and/or the frame 106 in a moldable, gel, or semi-liquid form prior to coupling of the shroud 124 with the frame 106.

The outer wall 132 is dimensioned to space the rear wall 130 of the shroud 124 a distance away from the back side of the solar panel 102 and to position the rear wall 130 in a generally parallel orientation to the back side of the solar panel 102. The outer wall 132 is comprised of a plurality of generally planar sections, each associated with a respective edge of the rear wall 130; the sections include a top section 132t, a pair of side sections 132s, and a bottom section 132b.

The bottom section 132b includes a drain port 138 disposed therein through which cooling fluid can pass. The bottom section 132b may be substantially planar or may be formed to direct a flow of cooling fluid toward the drain port 138. For example, the bottom section 132b may be at least partially depressed outward and away from the interior of the shroud 124 to direct the flow of cooling fluid toward the drain port 138 via gravity.

The drain port 138 may include a neck 140 extending outwardly from the bottom section 132b to which a drain tube 142 may be connected. The neck 140 can be configured to couple to the drain tube 142 via friction fit, e.g. a hose clamp or hose barb, or may include one or more features adapted for coupling to a fitting, such as threads, bayonet-style channels or pins, or the like. The drain tube 142 directs the cooling fluid to return to the heat exchanger 114, the reservoir 116, or the pump 118 for cooling and recirculation to the shroud 124.

The nozzles 128 are positioned and configured in the rear wall 130 of the shroud 124 to spray cooling fluid onto the back side of the solar panel 102 as depicted by spray 144 in FIG. 4. The nozzles 124 preferably collectively apply the cooling fluid to the entire back side of the solar panel 102 or at least to portions of the back side of the solar panel 102 associated with solar cells therein. The nozzles 128 may be static in that a single constant spray pattern is provided in an overlapping or non-overlapping arrangement. Or the nozzles 128 can be configured to oscillate, rotate, or otherwise move relative to the rear wall 130 to thus vary the direction and/or spray pattern of the spray 144 of cooling fluid from the nozzle 128. The nozzles 128 can be integrated into the shroud 124 or can comprise a nozzle assembly, e.g. a nozzle and one or more fittings, gaskets, and the like.

Figure 8:
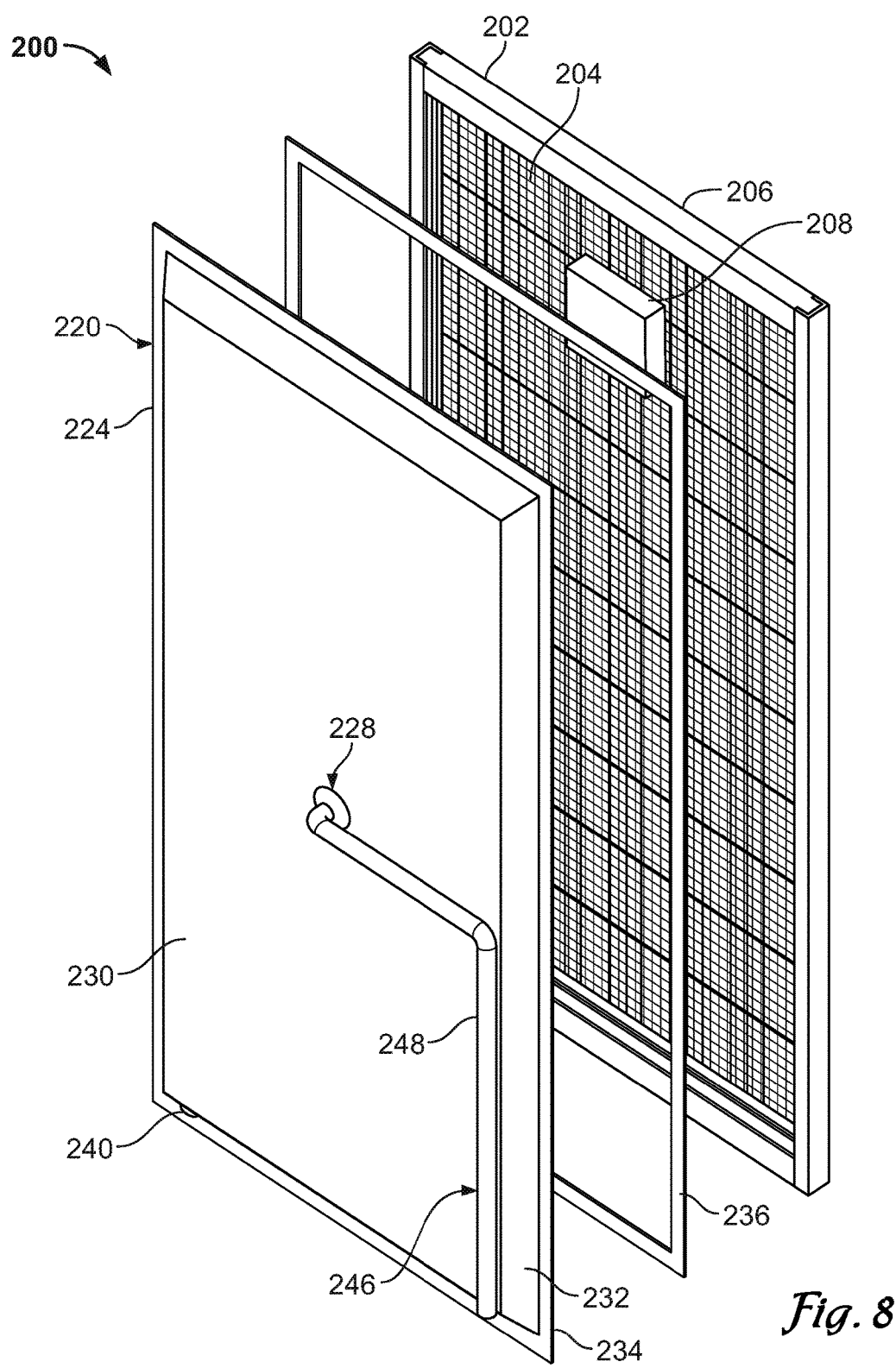
FIG. 8 is a back side exploded perspective view of a solar panel with a cooling apparatus with a single nozzle depicted in accordance with an embodiment of the invention.
Figure 9:
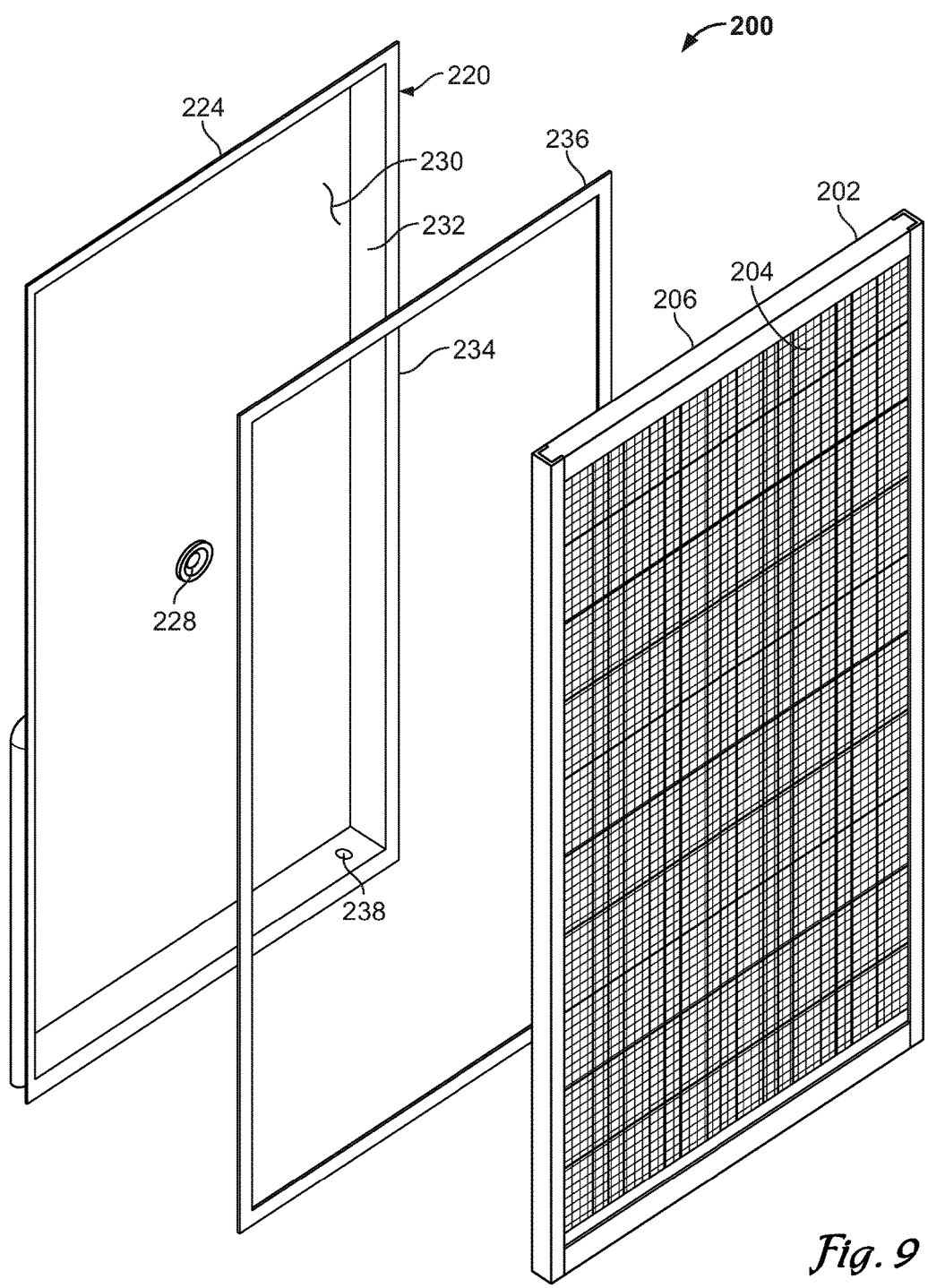
FIG. 9 is a front side exploded perspective view of the solar panel and cooling apparatus of FIG. 8.

The cooling system 100 depicted in FIGS. 2 and 3 depicts a plurality of nozzles 128 disposed in the rear wall 130 and spaced apart to form three rows and three columns of nozzles 128. FIGS. 8 and 9 depict a cooling system 200 that includes a single nozzle 228 disposed centrally within the rear wall 230 of the shroud 224. The nozzle 228 may be configured to provide a wide angled conical spray pattern or may oscillate and/or rotate to provide a spray pattern that is moved across the back side of the panel 202 in one or more directions. For example, the nozzle 228 may provide linear spray pattern that is oscillated side-to-side across the back side of the solar panel 202, among a variety of other spray patterns and movements.

Figure 10:
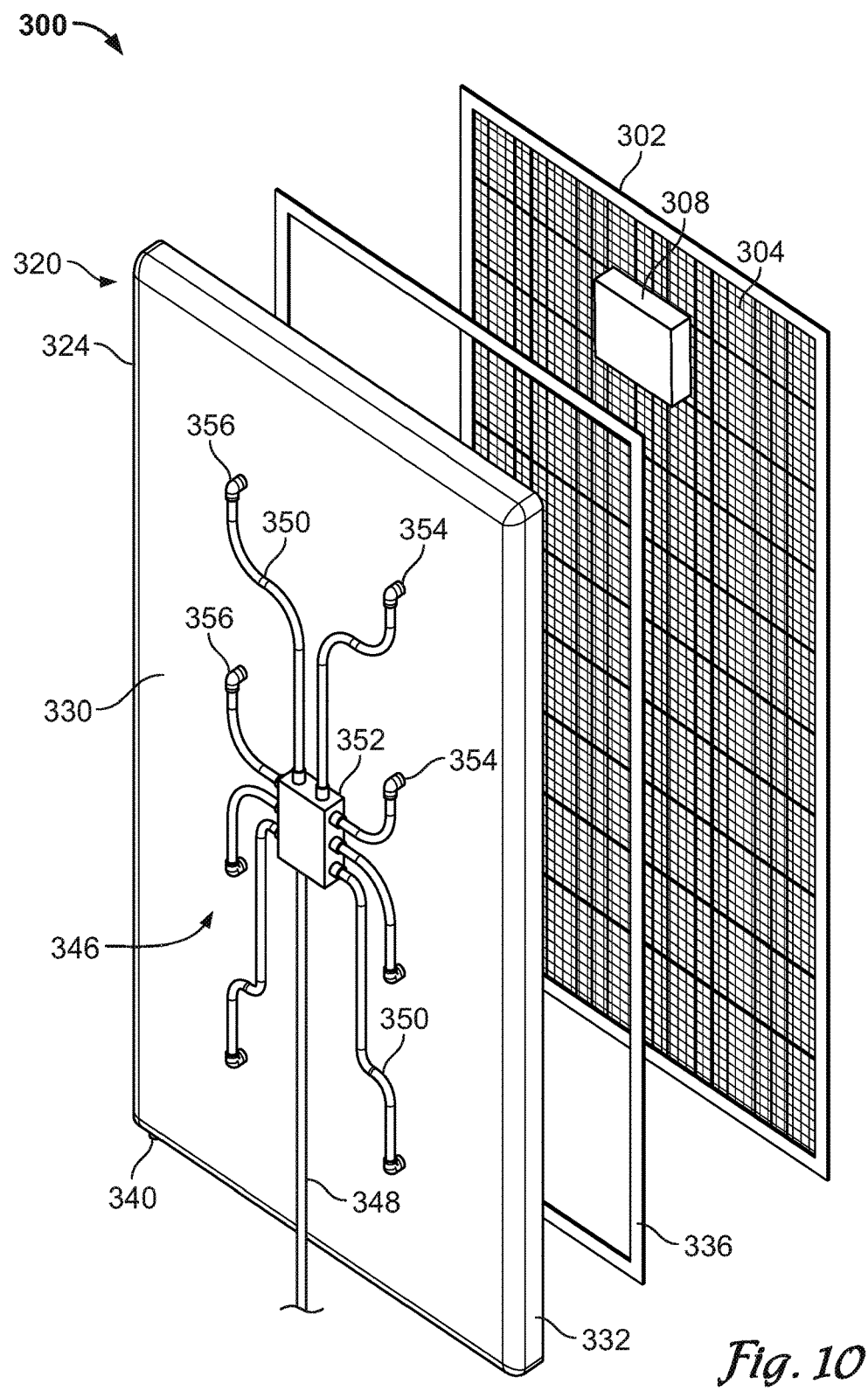
FIG. 10 is a back side exploded perspective view of a solar panel with an integrated cooling apparatus depicted in accordance with an embodiment of the invention.
Figure 11:
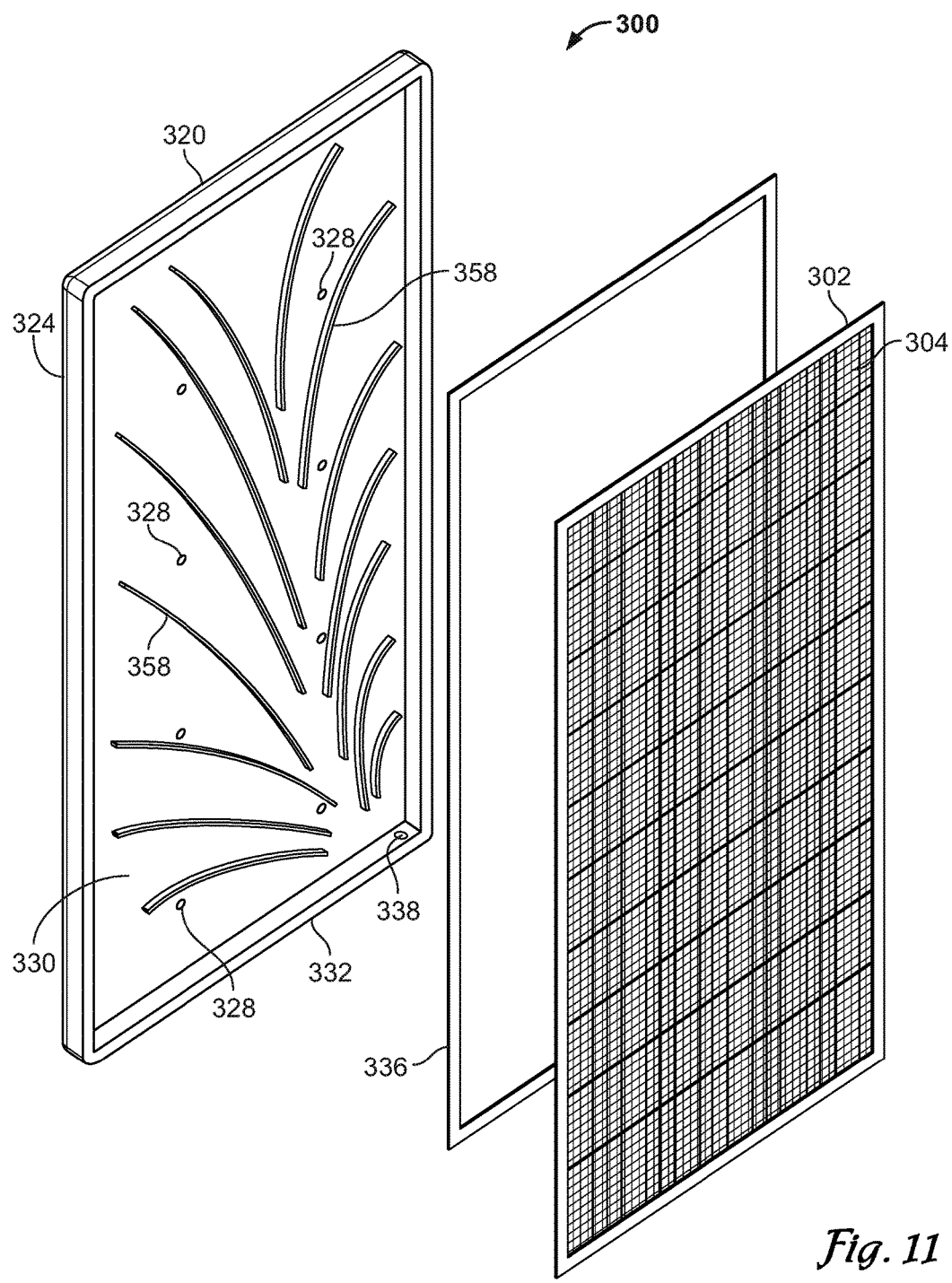
FIG. 11 is a front side exploded perspective view of the solar panel with integrated cooling apparatus of FIG. 10.

Movement of the nozzle 228 can be produced via fluid pressure and/or the flow of cooling fluid through the nozzle 228 or can be provided by a secondary module configured to move the nozzle 228 using one or more motors, magnets, linkages, or the like. FIGS. 10 and 11 depict another cooling system 300 that includes eight nozzles 328 arranged in two evenly spaced columns. A variety of other configurations of the nozzles 128, 228, and 328 or combinations thereof may be employed without departing from the scope of embodiments of the invention described herein.

With reference again to FIGS. 2-3, cooling fluid is communicated to the nozzles 128 via a distribution circuit 146. The distribution circuit 146 includes an inlet tube 148 that is in fluid communication with the pump 118 to receive cooling fluid therefrom. A plurality of secondary distribution tubes 150 extend from the inlet tube 148 and couple to one or more of the nozzles 128 to communicate cooling fluid thereto. Similarly, the cooling system 200, depicted in FIG. 8, includes an inlet tube 248 that couples directly to the nozzle 228. As depicted in FIGS. 2 and 8, the distribution circuits 146, 246 are coupled to the shroud 124, 224 via the connection to the nozzles 128, 228 or may be coupled to the rear wall 130, 230 of the shroud 124, 224 using one or more fasteners, welding, or the like. In one embodiment the distribution circuit 146, 246 is integrated into the rear wall 130, 230 of the shroud 124, 224, e.g. the inlet tube 148, 248 and the secondary distribution tubes 150 are formed internally within the rear wall 130, 230.

The cooling system 300 depicted in FIGS. 10 and 11 includes an inlet tube 348 that couples to a manifold 352 which distributes the cooling fluid to a plurality of secondary distribution tubes 350. Each of the secondary distribution tubes 350 further couple to a respective nozzle assembly 354. The nozzle assemblies 354 each include a right angle fitting 356 which couples between the secondary distribution tube 350 and the nozzle 328. In one embodiment, the nozzles 328 couple to the respective right angle fittings 356 through an aperture in the rear wall 330 to capture the rear wall 330 therebetween. As such, the nozzles 328 are adapted for simple installation on the shroud 324 and may be easily removed or interchanged for cleaning or altering the spray pattern provided thereby.

As depicted in FIG. 11, the shroud 324 of the cooling system 300 includes a plurality of ridges 358 on an interior surface of the rear wall 330. The ridges 358 may aid to direct cooling fluid that collects on the rear wall 330 to flow toward the drain port 338. The ridges 358 are of preferably of sufficiently small dimensions so as to not interfere with the spray pattern of the nozzles 328 and to not contact the back side of the solar panel 302. In another embodiment, the ridges 358 may contact the back side of the solar panel 302 and function in a manner similar to the diversion flanges 127 depicted in FIGS. 12 and 13. Although the ridges 358 are shown as being elongate and raised above the surface of the rear wall 330, the ridges 358 might also comprise channels or depressions in the rear wall 330 or another protuberance, recess, or texture applied to or formed in the rear wall 330.

The cooling system 300 is adapted for use with a solar panel 302 that does not include a frame, like the frame 106 of the solar panel 102 or that includes a low profile frame or frame having minimal dimensions, e.g. the solar panel 302 may include a rigid or semi-rigid banding about its perimeter configured to protect the array 304 but not to provide substantial structural support. The shroud 324 of cooling system 300 includes the rear wall 330 with the outer wall 332 sized to receive the solar panel 302 within the perimeter of the outer wall 332. The outer wall 332 may include a shoulder (not shown) on an inner surface thereof against which the solar panel 302 can be seated. The outer wall 332 and/or the shroud 324 generally, may thus function to provide structural support for the solar panel 302 in place of support that might otherwise be provided by a frame on the solar panel 302. As such, the shroud assembly 320 and the solar panel 302 can be provided in a low profile design and may be provided as pre-assembled, off-the-shelf unit for installation into the cooling system 300.

The cooling system 100 may also include one or more control units 159, such as a computing device, logic controller, or the like configured to operate one or more of the heat exchanger 114, the pump 118, and any other peripheral devices associated with the system 100. A variety of sensors 161 can be provided to aid the control unit 159 in operation of the system 100. For example, thermocouples can be provided to measure ambient temperatures, the temperature of the front and/or the back side of the solar panel 102, the temperature of the cooling fluid entering and/or leaving the shroud 124, the temperature of the cooling fluid entering and/or leaving the heat exchanger 114, and/or the temperature of air entering and/or leaving the heat exchanger 114. Flow meters and voltage meters, among a variety of other sensors 161 may also be employed to detect the state of various parts of the system 100. The sensors 161 can be coupled to the control unit 159 via a wired or wireless connection and can provide their data in realtime, when queried, or at a desired interval.

Data collected from these sensors 161 can be logged and employed by the control unit 159 to monitor and adjust operation of the pump 118 and the heat exchanger 114. The control unit 159 can manage operation of the system 100 on single-unit basis, e.g. manage the system 100 for a single solar panel 102, or on a larger scale multi-unit basis. In one embodiment, the system 100 is implemented in a large scale installation that includes a large number of solar panels 102, e.g. hundreds of solar panels 102, each having a respective shroud assembly 120. Data collected from sensors 161 associated with the system 100 is employed to provide cooling and flow optimization system-wide or based on subsets within the overall system 100.

With continued reference to FIGS. 1-5, operation of the cooling system 100 is described in accordance with an embodiment of the invention. The gasket 136 is disposed on the flange 134 or on the frame 106 of the solar panel 102. The shroud 124 is then coupled to the back side of the solar panel 102 and secured thereto using one or more of fasteners, clamps, adhesives, or the like. The inlet tube 148 is connected to a hose 160, tube, pipe, or similar fluid communicating element extending from the pump 118 and the drain port 138 is connected to the drain tube 142 to include the shroud assembly 120 within the closed loop 122 of the cooling system 100.

The solar panel 102 with the shroud assembly 120 coupled thereto is mounted as desired to receive solar radiation or light from the sun 162. The solar panel 102 can be a single stand-alone panel 102 or can be included as part of a larger array of solar panels 102. In an array of solar panels 102, each of the solar panels 102 can be provided with a respective shroud assembly 120 and coupled to the closed loop 122. In another embodiment, the shroud assembly 120 can be configured to couple to a plurality of solar panels 102. The shroud assembly 120 is configured to not interfere with available mounting hardware for the solar panel 102. The shroud assembly 120 can be configured for coupling to available mounting hardware and/or apparatus; for example, the rear wall 130 may include a mounting plate or similar mounting structures on an exterior surface thereof. The hoses 160 and the drain tubes 142 of the closed loop 122 can be connected in a desired configuration based on particular design constraints and considerations of the particular array.

The control unit 159 manages operation of the pump 118 and the heat exchanger 114 to ensure proper cooling of the solar panel 102. The pump 118 is operated to provide a supply of cooling fluid to the nozzles 128 with sufficient pressure or flow rate to produce the desired spray pattern from the nozzles 128. The flow rate may also be varied as cooling demands increase or decrease by altering the output of the pump 118 or by providing one or more variable flow-rate valves in the system, among other methods.

The cooling fluid contacts the back side of the solar panel 102 and/or the backing element 112. Thermal energy in the solar panel 102 is transferred to the cooling fluid thus cooling the solar panel 102 and heating the cooling fluid. The cooling fluid drips, flows, or otherwise moves along the back side of the solar panel 102 or the surface of the rear wall 130 toward the bottom of the shroud 124 to the drain port 138 via gravity.

The cooling fluid may alternatively evaporate due to absorption of thermal energy from the solar panel 102. Evaporated cooling fluid may condense on the shroud 124 and flow along the shroud 124 toward the drain port 138 to return to the circuit; evaporated cooling fluid is retained within system 100 and does not escape to the environment.

The drain tube 142 communicates the cooling fluid to the heat exchanger 114 which cools the cooling fluid to a desired temperature before depositing the cooling fluid into the reservoir 116. The cooling fluid is then again drawn from the reservoir 116 by the pump 118 and recirculated through the cooling system 100.

In the embodiment depicted in FIGS. 12 and 13, the diversion flanges 127 alter the flow of the cooling fluid along the back side of the solar panel 102''' and/or the backing element 112'''. As shown by arrows 164 in FIG. 13, the cooling fluid sprayed onto a top portion 166 of the solar panel 102''' flows or drips downward and is diverted by the diversion flanges 127 away from the solar panel 102''' and onto the rear wall 130. Similarly, cooling fluid sprayed onto a central portion 168 of the solar panel 102''' is diverted onto the rear wall 130 before flowing into a bottom portion 170 of the solar panel 102'''. As such, cooling fluid that is warmed by contact with the back side of the solar panel 102''' in the top or central portions 166, 168 does not contact the back side of the solar panel 102''' in the central or bottom portions 168, 170 respectively. Thermal contamination between the top, central, and bottom portions 166, 168, 170 is thus prevented or reduced.

For example, when the top portion 166 receives a greater amount of sunlight due to shadows covering the central and bottom portions 168, 170, cooling fluid sprayed onto the top portion 166 is warmed to a greater degree than that sprayed onto the central and bottom portions 168, 170. If the cooling fluid sprayed onto the top portion 166 were allowed to flow along the central and bottom portions 168, 170, thermal contamination of the central and bottom portions 168, 170 may occur. The thermal contamination may reduce the cooling received by the central and bottom portions 168, 170 and/or may heat the central and bottom portions 168, 170.

In another embodiment, the backing element 112'' comprises or includes one or more TEGs 129 which absorbs thermal energy from the solar panel 102'' to heat one surface of the TEG 129. The opposite surface of the TEG 129 is cooled by the cooling fluid to produce a thermal gradient within the TEG 129. TEG 129 thus produces an additional electrical output that further increases the total output and/or efficiency of the solar panel 102''.

Although shown and described separately, it is to be understood that one or more of the above describe features of the backing elements 112, 112', 112'', 112''' and/or of the shroud assemblies 120, 220, 320 can be employed in combination. For example, the shroud 324 might be employed with the solar panel 112''' to provide a low profile design that includes the diversion flanges 127, or a solar panel might be configured with a backing element that includes both the diversion flanges 127 and the TEGs 129, among other combinations. All such combinations are within the scope of embodiments of the invention described herein.

Many different arrangements of the various components depicted, as well as components not shown, are possible without departing from the scope of the description provided herein. Embodiments of the technology have been described with the intent to be illustrative rather than restrictive. Alternative embodiments will become apparent to readers of this disclosure after and because of reading it. Alternative means of implementing the aforementioned can be completed without departing from the scope of embodiments of the invention. Identification of structures as being configured to perform a particular function in this disclosure is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of embodiments of the invention described herein.

What is claimed is:

1. A solar panel cooling system comprising:
   a solar panel;
   a shroud including a rear wall that is spaced apart from a backside of the solar panel and an outer wall that extends from a perimeter of the rear wall to a perimeter of the solar panel, the shroud enclosing a space between the back side of the solar panel and the rear wall in a liquid-tight configuration;
   a nozzle disposed in the rear wall of the shroud and directed to provide a spray of a cooling fluid onto the back side of the solar panel, the spray of the cooling fluid being contained within the space between the shroud and the solar panel, the cooling fluid leaving the space via a drain port and being recirculated within a closed-loop circuit.

2. The solar panel cooling system of claim 1, wherein the shroud includes a flange extending from the perimeter of the outer wall in a plane that is substantially parallel to the back side of the solar panel, the flange providing a mating surface between the shroud and the solar panel.

3. The solar panel cooling system of claim 1, further comprising:
   a sealing member disposed between the shroud and the solar panel to provide the liquid-tight seal therebetween.

4. The solar panel cooling system of claim 1, wherein the solar panel includes a backing element that increases the transfer of thermal energy from the solar panel to the cooling fluid.

5. The solar panel cooling system of claim 4, wherein the backing element comprises a plurality of protuberances extending from the back side of the solar panel.

6. The solar panel cooling system of claim 1, wherein the solar panel includes one or more thermo-electric generator elements disposed on the back side of the solar panel, the thermo-electric generator elements being heated on a first side by the solar panel and being cooled on an opposite second side by the cooling fluid.

7. The solar panel cooling system of claim 1, wherein the solar panel includes one or more diversion elements extending from the back side of the solar panel that obstruct a drainage path of the cooling fluid, the drainage path being along the back side of the solar panel and the diversion elements diverting the cooling fluid away from the back side of the solar panel.

8. The solar panel cooling system of claim 1, wherein the nozzle pivots relative to the rear wall.

9. A solar panel cooling system comprising:
a shroud adapted to couple to a solar panel to enclose a back side of the solar panel in a liquid-tight configuration, the shroud including a nozzle disposed in a wall thereof and directed to provide a spray of a cooling fluid onto the back side of the solar panel, the shroud containing the spray of cooling fluid within a space formed between the shroud and the solar panel, the shroud including a drain port that is coupleable to a closed-loop circuit, the cooling fluid being recirculated through the drain port to the closed-loop circuit for cooling and return to the nozzle.

10. The solar panel cooling system of claim 9, wherein the closed-loop circuit includes a heat exchanger that cools the cooling fluid, a reservoir that stores a quantity of the cooling fluid, and a pump that provides the cooling fluid to the nozzle.

11. The solar panel cooling system of claim 9, wherein the shroud includes a rear wall that is configured to lie substantially parallel to and spaced apart from the back side of the solar panel, an outer wall extending between the perimeter of the rear wall and the solar panel and enclosing a space formed between the rear wall and the back side of the solar panel, and a flange extending from a distal edge of the outer wall and generally parallel to the back side of the solar panel, the flange providing structure for coupling the shroud to a frame extending around the perimeter of the solar panel.

12. The solar panel cooling system of claim 9, wherein the shroud includes a rear wall that is substantially parallel to and spaced apart from the back side of the solar panel, an outer wall extending from the perimeter of the rear wall and generally perpendicularly to the rear wall, the outer wall having dimensions sufficient to receive an outer perimeter of the solar panel therein, the outer wall maintaining the rear wall and the solar panel in a spaced apart relation and enclosing a space formed between the rear wall and the back side of the solar panel.

13. The solar panel cooling system of claim 9, wherein the shroud includes a rear wall that is spaced apart from the back side of the solar panel and includes one or more ridges extending toward the back side of the solar panel, the ridges directing a drainage flow of the cooling fluid.

14. A solar panel cooling system comprising:
a solar panel;
a shroud enclosing a back side of the solar panel in a liquid-tight configuration, the shroud including a rear wall that is spaced apart from a back side of the solar panel and an outer wall extending between the rear wall and the solar panel and enclosing a space formed between the rear wall and the solar panel;
a plurality of nozzles disposed in the rear wall of the shroud and directed to provide a spray of a cooling fluid onto the back side of the solar panel, the spray of cooling fluid being contained within the space between the shroud and the solar panel, the cooling fluid leaving the space via a drain port formed in the outer wall and being recirculated within a closed-loop circuit.

15. The solar panel cooling system of claim 14, wherein the solar panel includes a backing element that increases the transfer of thermal energy between the solar panel and the cooling fluid.

16. The solar panel cooling system of claim 14, further comprising:
one or more thermo-electric generator elements disposed on the back side of the solar panel, a first surface of the one or more thermo-electric generator elements being heated by the solar panel and an opposite second surface of the thermo-electric generator elements being cooled by the cooling fluid.

17. The solar panel cooling system of claim 14, further comprising:
a diversion element disposed on the back side of the solar panel and obstructing a drainage path of the cooling fluid, the drainage path being along the back side of the solar panel and the diversion element diverting the cooling fluid away from the back side of the solar panel.

18. The solar panel cooling system of claim 14, further comprising:
a manifold coupled to an inlet tube to receive cooling fluid from the closed-loop circuit, the manifold distributing the cooling fluid between the plurality of nozzles via a plurality of secondary distribution tubes.

* * * * *